June 4, 1957 — S. T. BUSEY ET AL — 2,794,678
EQUALIZER BRACKET UNIT FOR BOOM SPRAYERS
Filed Nov. 22, 1954
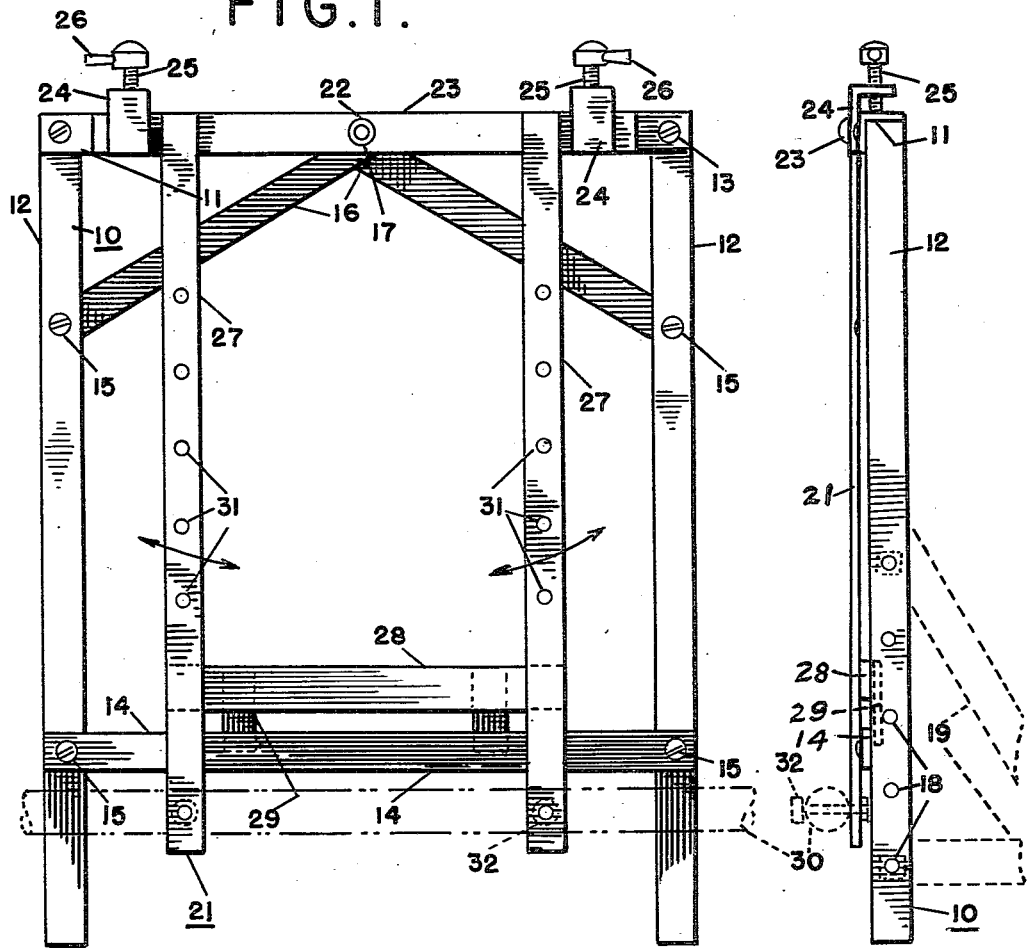
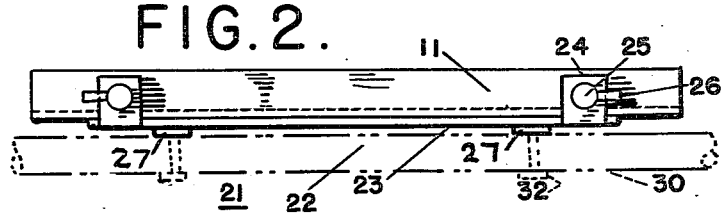
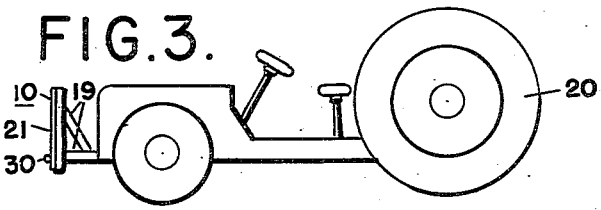
*INVENTOR.*
SAMUEL T. BUSEY.
ELSIE T. BUSEY.
BY *Howard J. Whelan.*
ATTORNEY.

2,794,678

EQUALIZER BRACKET UNIT FOR BOOM SPRAYERS

Samuel T. Busey and Elsie T. Busey, Rising Sun, Md.

Application November 22, 1954, Serial No. 470,346

2 Claims. (Cl. 299—30)

This invention relates to agricultural equipment, and more particularly to an equalizer bracket unit applicable to the structural chassis-work of and agricultural tractor or vehicle for carrying a boom sprayer.

While boom sprayers have been employed heretofore, they have been rigidly mounted on a tractor frame or trailer, so that when spraying over sloping fields, one boom end drags on the ground, while the other boom end is high in the air, thus causing damage to the crop, to the sprayer, and poor distribution of the chemicals.

This arrangement is expensive, more or less complicated, requires a lot of attention and undue maintenance, and considerable skill on the part of the operator. This invention avoids these objections by providing a simple structural unit, readily attachable to the conventional frame or chassis-work of a tractor or other suitable mobile unit. It will permit adjustments to be expeditiously and easily made to meet the conditions of the terrain, and ordinarily require little maintenance expense.

It is the object of this invention to provide a new and improved boom sprayer equalizer bracket attachable to the frame of a tractor or other vehicle, that will avoid one or more of the disadvantages and limitations of the prior art.

Another object of this invention is to provide a new and improved boom sprayer equalizer bracket unit for attachment to a tractor or other mobile unit, that can be adjusted to avoid contact with the terrain on which it travels.

A further object of the invention is to provide a new and improved boom sprayer carrier unit that will keep the boom ends an equalized distance above the ground whether spraying over sloping or level ground, that will be simple in construction, easily attached or detached to and from a vehicle such as a field tractor or the like, and designed to meet the requirements of various types of the latter.

Other objects of the invention will become apparent as the invention is more fully set forth.

For a better understanding of the invention and the objects thereof reference is made to the accompanying drawings, and the following description, which together illustrate a particular form by way of example, while the claims indicate the scope of the invention.

In the drawings:

Figure 1 is a front elevation of the equalizer bracket unit for boom sprayers embodying this invention;

Figure 2 is a plan view of Figure 1;

Figure 3 is a side elevation of a tractor indicating the manner in which the unit is attached; and Figure 4 is a side elevation of Figure 1.

Similar reference numerals refer to similar parts throughout the drawings.

In the drawings, the structure consists of a rigid frame 10 that is stationary and preferably built up of angles and straps, with an outline of rectangular form. The angles make up the top member 11, generally horizontal, with two side legs 12, vertically locked into it at the corners by welding or affixed together by bolts 13. A cross bar member 14 of strap material is likewise welded or affixed to the lower portion of the legs 12 by bolts 15. Struts 16 extending from the legs 12 near their upper ends, meet together at an apex where they are joined to the top members 11 by welding or by a bolt 17. The legs 12 are drilled to provide spaced holes 18 at the side. These holes 18 enable bolts (not indicated) to be inserted to secure the angles and brackets 19 at the front of the chassis of a tractor 20, to the legs 12 in a vertical position. There are enough holes 18 in the legs to permit adjustments to be made that will conform with the requirements of any conventional tractor, for the purpose in question.

A movable boom carrier frame of rectangular outline is pivoted at 22 on the bolt 17 so it can swing in pendulum manner until locked in predetermined relation with the terrain. The carrier consists of a top strap member 23 having a middle hole through which the bolt 17 passes. Adjacent the ends of the strap 23 are knee elements 24 welded thereto and bent over above, but not connecting to the angle member 11. A jack screw 25 is adjustably mounted in each knee element 24 and projects down against the angle member 11. When the jack screw 25 is screwed down, it presses down on the top member 11 and incidently raises the respective end portion of the strap 23. This tends to tilt the carrier 21 in that direction. If the jack screw 25 at the opposite end is screwed down, it incidently raises that end. In this manner the carrier can be levelled or tilted in a vertical plane to suit the operator. A handle 26 on each jack screw 25 enables it to be readily manipulated. Pending strap members 27 are welded preferably to the top strap member 23 and extend vertically (normally) down in front of the stationary frame and against the front surface of the cross bar 14. A brace 28 of flat material joins but keeps apart the members 27. This brace is placed close enough to the cross bar 14 and in line with it, as to strike the latter when the carrier is tilted in either direction beyond a predetermined angle. Clips 29 are provided in the rear of the brace 28 to guide and slide against the cross-bar 14 and thus maintain the carrier in alignment with the stationary frame 10 at all times. Holes 31 in the strap members 27 enable bolts to be inserted for securing a sprayer boom 30 to it in adjustable positions. The bolts 32 shown dotted in the holes 31 enable the sprayer boom to be held at various heights above the terrain, when the stationary frame is attached to the chassis of the tractor. There are enough holes and their spacing so arranged that a very comprehensive amount of adjustment can be provided for, whether required by the terrain or the make and design of the tractor. The pendulum swing of the boom carrier 21 permits its adjustment by the jack screws 25 to vary from that of the horizontal plane of the tractor. Thus some of the features of the device are as follows:

The unit can carry the boom sprayer in a plane parallel to that in which its supporting tractor travels.

It can carry a sprayer boom at various distances above the terrain;

It can carry the sprayer boom at various angles to the plane of the ground and of the tractor that supports it;

Adjustments of the unit can be made in a few moments by the operator, without the use of any tools;

Attachment of the unit to a conventional tractor can be made easily and quickly;

The unit may be assembled or knocked-down expeditiously;

Its structure is simple, light and compact;

Maintenance and repairs that are apt to occur, are remote;

It may be manufactured economically and without expensive tools or equipment.

While but one general form of the invention is shown in the drawings and described in the specification, it is not desired to limit this application for patent to this particular form, as it is appreciated that other forms of construction could be made that would use the same principles and come within the scope of the appended claims.

Having thus described the invention what is claimed is:

1. A device of the kind described for adjustably supporting a boom sprayer on a vehicle, comprising a stationary frame secured to the chassis of the vehicle, said frame being of rectangular form and comprising parallel top and bottom elements and parallel side elements, a juxtaposed carrier frame of rectangular form and comprising parallel top and bottom elements and parallel side elements, the top element of the carrier frame having a portion extending over the corresponding top element of the stationary frame, means for pivoting the carrier frame on the stationary frame, said means being carried medially of both aforementioned top elements, means for securing the boom sprayer at the ends of the side elements of the carrier frame opposite the pivoting means, whereby the boom sprayer is tiltable with the carrier frame about the pivoting means in either of two opposite directions, and means for limiting the amount of tilt and locking the carrier frame in adjusted tilted position, said means being separate and independent from the pivoting means and being carried by the aforesaid extended portion of the carrier frame and abutting the top element of the stationary frame.

2. A device of the kind described in claim 1, wherein the limiting and locking means consist of a pair of jack screws and a handle thereon to rotate the same, each jack screw being located on opposite sides of the pivoting means.

References Cited in the file of this patent

UNITED STATES PATENTS

| | | |
|---|---|---|
| 598,945 | Martin | Feb. 15, 1898 |
| 1,030,744 | Neumann | June 25, 1912 |
| 1,058,752 | Johnson | Apr. 15, 1913 |
| 1,447,212 | Kerr | Mar. 6, 1923 |
| 1,760,940 | English | June 3, 1930 |
| 1,863,163 | Malti | June 14, 1932 |
| 2,618,509 | Carlson | Nov. 8, 1952 |

FOREIGN PATENTS

| | | |
|---|---|---|
| 219,166 | Great Britain | of 1924 |